United States Patent [19]

Marchand et al.

[11] Patent Number: 4,980,330

[45] Date of Patent: Dec. 25, 1990

[54] POLYMERIZATION OF OLEFINS IN THE PRESENCE OF A CATALYST PREPARED FROM AN INORGANIC OXIDE WHICH HAS NOT BEEN HEAT OR CHEMICALLY TREATED, ORGANOMAGNESIUM COMPOUND, ORGANIC HYDROXYL-CONTAINING COMPOUND, REDUCING HALIDE AND TRANSITION METAL COMPOUND

[75] Inventors: Gary R. Marchand; Ricardo Fuentes, Jr., both of Baton Rouge, La.; William M. Coleman, III, Winston-Salem, N.C.

[73] Assignee: The Dow Chemical Company, Midland, Mich.

[21] Appl. No.: 443,981

[22] Filed: Nov. 30, 1989

Related U.S. Application Data

[60] Division of Ser. No. 277,624, Nov. 29, 1988, Pat. No. 4,910,272, which is a continuation-in-part of Ser. No. 145,788, Jan. 19, 1988, abandoned.

[51] Int. Cl.$^5$ .......................... C08F 4/02; C08F 4/643
[52] U.S. Cl. ..................................... 502/115; 502/111; 502/120; 502/125
[58] Field of Search ................. 502/111, 115, 120, 125

[56] References Cited

U.S. PATENT DOCUMENTS

| 3,925,338 | 12/1975 | Ort | 502/103 X |
| 4,526,943 | 7/1985 | Fuentes et al. | 526/142 X |
| 4,544,647 | 10/1985 | Fuentes et al. | 502/115 |

FOREIGN PATENT DOCUMENTS 170059  5/1986  European Pat. Off. ............ 502/120

Primary Examiner—Patrick P. Garvin

[57] ABSTRACT

A catalyst for polymerizing olefins is the product resulting from mixing in an inert hydrocarbon diluent, a mixture of (A) an inorganic oxide, (B) an organomagnesium material, (C) an organic hydroxyl-containing material, (D) a reducing halide source, and (E) a transition metal compound.

6 Claims, No Drawings

POLYMERIZATION OF OLEFINS IN THE PRESENCE OF A CATALYST PREPARED FROM AN INORGANIC OXIDE WHICH HAS NOT BEEN HEAT OR CHEMICALLY TREATED, ORGANOMAGNESIUM COMPOUND, ORGANIC HYDROXYL-CONTAINING COMPOUND, REDUCING HALIDE AND TRANSITION METAL COMPOUND

CROSS-REFERENCE TO RELATED APPLICATION

This is division of application Ser. No. 07/277,624 filed Nov. 29, 1988 and now U.S. Pat. No. 4,910,272, which is a continuation-in-part of copending application Ser. No. 145,788 filed Jan. 19, 1988 (now abandoned), which is incorporated herein by reference in its entirety.

BACKGROUND OF THE INVENTION

The invention relates to a new catalyst composition useful for initiating and promoting polymerization of one or more α-olefins and to a polymerization process employing such a catalyst composition.

Fuentes, Jr. and Esneault disclosed in U.S. Pat. Nos. 4,526,943 and 4,544,647 the polymerization of α-olefins employing a high yield catalyst. This high yield catalyst was prepared from an organomagnesium material, an organic hydroxyl-containing material, a reducing halide source and a transition metal compound. While this catalyst prepared polymers in high yield, it would be desirous if polymers could be produced with varying particle sizes. The present invention provides a method for producing polymers with varying particle sizes. It is desirable to have polymers produced in varying particle sizes because in some instances such as when an α-olefin polymer is to be chemically modified while still in the powder form, it is desirable to present as small a particle size as possible in order to present a large surface area for modification. It is also sometimes desirable to have a small average particle size when efficient removal of the inert polymerization diluent from the α-olefin polymer is required. In some instances in which extrusion processing the polymer is not performed, it is desirable to have as large a particle size as possible for improved handling of the α-olefin polymer.

The present invention provides a method for preparing polymers in various and controlled particle sizes by employing in the catalyst formulation an inorganic oxide of various particle sizes. The particle size of the resultant particle varies with the particle size of the inorganic oxide. An additional advantage of the present invention is that no activation or special preparation of the inorganic oxide is required before its use in the preparation of the catalyst. In most instances with catalysts prepared using as a component of their formulation an inorganic oxide, the inorganic oxide must first be calcined, or heat treated, in order to remove water and activate the surface of the inorganic oxide.

SUMMARY OF THE INVENTION

The present invention pertains to a catalytic product resulting from admixing in an inert hydrocarbon diluent and in an atmosphere which excludes moisture and oxygen (A) at least one inorganic oxide support containing a metal element M having a particle size of 1000 microns or less, preferably about 800 microns or less, most preferably about 400 microns or less and which has not been heat or chemically treated prior to contact with the other catalyst components;

(B) at least one hydrocarbon soluble organo-magnesium compound;

(C) at least one organic hydroxyl-containing compound;

(D) at least one reducing halide ($X_{red}$) source; and (E) at least one transition metal (Tm) compound; and wherein (1) the components are added in the order (A), (B), (C), (D) and (E) or (A), (B), (C), (E) and (D) or (B), (A), (C), (D) and (E) or (B), (A), (C), (E) and (D);

(2) the components are employed in quantities so as to provide the following atomic ratios
  (a) Mg:Tm of from about 0.1:1 to about 100:1, preferably from about 1:1 to about 40:1 and most preferably from about 5:1 to about 20:1;
  (b) M:Mg of from about 0.1:1 to about 1000:1, preferably from about 1:1 to about 500:1, most preferably from about 1:1 to about 100:1;
  (c) $X_{red}$:Mg of from about 3:1 to about 20:1, preferably from about 6:1 to about 20:1, most preferably from about 8:1 to about 14:1; and (3) component (C) is present in a quantity such that for every metal atom present in component (B), there remains on the average no more than about 0.9 hydrocarbon groups attached to any metal atom therein.

Another aspect of the present invention pertains to a process for polymerizing α-olefins or mixtures thereof which comprises conducting the polymerization in the presence of the aforementioned catalysts.

DETAILED DESCRIPTION OF THE INVENTION

The catalysts of the present invention are prepared by adding in a hydrocarbon medium the following components, (A) an inorganic oxide of specified particle size, (B) hydrocarbon soluble organomagnesium compound, (C) organic hydroxyl-containing compound (D) reducing halide source and (E) transition metal compound. The catalyst components are added in the order of (A), (B), (C), (D) and (E) or (A), (B), (C), (E) and (D) or (B), (A), (C), (D) and (E) or (B), (A), (C), (E) and (D). The catalyst is prepared in an inert atmosphere such as nitrogen, argon, and the like at temperatures of from about zero degrees C. to about 50 degrees C.

The catalyst can be employed as prepared or, if desired, the solid insoluble portion can be separated from the soluble portion and the recovered solid washed with inert one or more hydrocarbon diluents before employing as the transition metal component of the catalyst to polymerize olefins or combinations of olefins in the presence or absence of other polymerizable ethylenically unsaturated monomers.

The solid insoluble portion of the catalyst can be separated by any of the well known liquid-solid separation techniques such as, for example, decantation, filtration, centrifugation and the like.

Suitable inorganic oxides which can be employed herein include, for example, those inorganic oxides of the metals aluminum and silicon. Particularly suitable inorganic oxides include, for example, silicon dioxide, aluminum oxide, zeolites, combinations thereof and the like.

The organomagnesium materials which are suitably employed in the present invention include those represented by the formula $R_2Mg \cdot zMeR'_{x'}$ wherein each R is independently a hydrocarbyl group and each R' is independently a hydrogen, hydrocarbyl or hydrocarbyloxy group, Me is Al, Zn or B, x has a value from 0 to 10 and x' has a value equal to the valence of Me.

The term hydrocarbyl as employed herein refers to a monovalent hydrocarbon group such as alkyl, cycloalkyl, aryl, aralkyl, alkenyl and similar hydrocarbon groups having from 1 to about 20 carbon atoms with alkyl groups having from 1 to 10 carbon atoms being preferred.

The term hydrocarbyloxy as employed herein refers to monovalent oxyhydrocarbon group such as alkoxy, cycloalkoxy, aryloxy, aralkoxy, alkenoxy and similar oxyhydrocarbon groups having from 1 to about 20 carbon atoms with alkoxy groups having from 1 to 10 carbon atoms being the preferred hydrocarbyloxy groups.

The quantity of $MeR'_{x'}$, i.e. The value of x in the formula $R_2M_2 \cdot xMeR'_{x'}$, is preferably the minimum amount which is sufficient to render the magnesium compound soluble in the inert solvent or diluent which is usually a hydrocarbon or mixture of hydrocarbons. The value of x therefore is from zero to about 10, usually from about 0.2 to about 2.

Particularly suitable organomagnesium compounds include, for example, di(n-butyl)magnesium, n-butyl-sec-butyl magnesium, diisopropyl magnesium, di(n-hexyl) magnesium, isopropyl-n-butyl magnesium, ethyl-n-hexyl magnesium, ethyl-n-butyl magnesium, di(n-octyl) magnesium, butyl octyl magnesium and such complexes as di(n-butyl) magnesium·⅓ aluminum triethyl, di(n-butyl) magnesium·1/6 aluminum triethyl, n-butyl-sec-butyl magnesium·½ triisobutylaluminum, butyl ethyl magnesium·½ triisobutylaluminum, butyl ethyl magnesium·¼ triisobutylaluminum, butyl octyl magnesium·½ triisobutylaluminum, dihexylmagnesium·½ triisobutylaluminum, mixtures thereof and the like.

Suitable hydroxyl-containing organic compounds include, for example, alcohols, glycols, polyoxyalkylene glycols, mixtures thereof and the like.

Suitable such compounds include those represented by the formulas $R-(O-R')-_nOH$ and $Z-((O-R'-)_nO-R'')_{n'}$ wherein each R is a hydrocarbyl group having from 1 to about 20, preferably from 1 to about 10 carbon atoms or a hydrogen: each R' is independently a divalent hydrocarbyl group having from 1 to about 20, preferably from 1 to about 10 carbon atoms; each R'' is independently hydrogen or a hydrocarbyl group having from 1 to about 20, preferably from 1 to about 10 carbon atoms, at least one of which is hydrogen; Z is a multivalent organic group containing from 2 to about 20 carbon atoms; n has a value from zero to about 10; and n' has a value of from 2 to about 10.

Particularly suitable organic hydroxyl containing compounds include alcohols such as for example, methyl alcohol, ethyl alcohol, n-propyl alcohol, isopropyl alcohol, n-butyl alcohol, sec-butyl alcohol, tert-butyl alcohol, -b 2-pentanol, n-octyl alcohol, octadecyl alcohol, glycols, 1,2-butylene glycol, 1,3-propylene glycol, 1,4-butanediol, 1,6-hexane diol, other hydroxyl containing compound such as, for example, glycerine, trimethylol propane, hexane triol, phenol, 2,6-di-tert-butyl-4-methylphenol, mixtures thereof and the like. Also suitable are the adducts of ethylene oxide, 1,2-propylene oxide, 1,2-butylene oxide, 2,3-butylene oxide, styrene oxide or mixtures of such oxides with the previously mentioned or other hydroxyl-containing compounds such as pentaerylthritol, sucrose, sorbitol and the like, as well as the alkyl and aryl capped hydoxyl containing compounds so long as there remains at least 1 hydroxyl group per molecule.

Suitable reducing halide sources includes those represented by the formulas $Al(R_3)_{3-m}X_m$ and $B(R_3)_{3-m}X_m$ including mixtures thereof wherein each $R_3$ is independently hydrogen or a hydrocarbyl group as hereinbefore defined, X is a halogen, and m has a value from 1 to 2.

Particularly suitable reducing halides include, for example, ethylaluminumdichloride, diethylaluminum chloride, ethylaluminum sesquichloride, ethylboron dichloride, diethylboron chloride, mixtures thereof and the like.

Suitable transition metal compounds which can be employed include those represented by the formulas $TmY_nX_{z-n}$ and

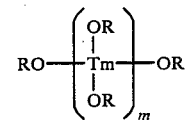

wherein Tm is a transition metal in its highest stable valence state and being selected from groups IV-B and V-B of the Periodic Table of the Elements; Y is oxygen, —OR'' or —NR''$_2$; R is a hydrocarbyl group having from 1 to about 20 carbon atoms, preferably from 1 to about 10; R'' is hydrogen or a hydrocarbyl group having from 1 to about 20 carbon atoms; X is a halogen, preferably chlorine or bromine; z has a value corresponding to the valence of the transition metal, Tm; m has a value from 2 to about 20, preferably from 2 to about 10; n has a value of from zero to 5 with the value of z-n being from zero up to a value equal to the valence state of the transition metal, Tm.

Particularly suitable transition metal compounds include, for example, titanium tetrachloride, titanium tetrabromide, dibutoxy titanium dichloride, monoethoxy titanium trichloride, isopropoxytitanium trichloride, tetraisopropoxytitanium, tetrabutyoxytitanium, tetra(2-ethylhexoxy)titanium isopropyltitanate decamer, vanadium oxytrichloride, zirconium tetrachloride, tetrabutoxyzirconium, vanadium tetrachloride, mixtures thereof and the like.

Suitable organic inert diluents in which the catalyst can be prepared and in which the α-olefin polymerization can be conducted include, for example, liquefied ethane, propane, isobutane, n-butane, isopentane, n-pentane, n-hexane, the various isomeric hexanes, isooctane, paraffinic mixtures of alkanes having from 8 to 12 carbon atoms, cyclohexane, methylcyclopentane, dimethylcyclohexane, dodecane, eicosane industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Suitable cocatalysts or activators with which the catalysts of the present invention can be reacted, contacted or employed in the polymerization of α-olefins includes those aluminum, boron, zinc or magnesium compounds represented by the formulas $Al(R^3)_{3-a}X'_a$, $B(R^3)_{3-a}X'_a$, $Mg(R^3)_2$, $MgR^3X'$, $Zn(R^3)_2$ or mixtures thereof wherein $R^3$ is as previously defined; $X'$ is a halogen, preferably chlorine or bromine; and a has a value of from zero to 2, preferably zero to 1 and most preferably zero.

Particularly suitable cocatalysts or activators include, for example, diethylaluminum chloride, ethylaluminum dichloride, diethylaluminum bromide, triethylmagnesium, triisobutylaluminum, diethylzinc, dibutylmagnesium, butylethylmagnesium, butylmagnesium chloride, diisobutylaluminum hydride, isoprenylaluminum, triethylboron, trimethylaluminum, mixtures thereof and the like.

The cocatalysts or activators are employed in quantities such that the atomic ratio of the Al, B, Mg, Zn or mixtures thereof to Tm is from about 0.1:1 to about 1000:1, preferably from about 5:1 to about 500:1 and most preferably from about 10:1 to about 200:1.

The catalyst and cocatalyst or activator may be added separately to the polymerization reactor or they may be mixed together prior to addition to the polymerization reactor.

Olefins which are suitably homopolymerized or copolymerized in the practice of this invention are generally any one or more of the aliphatic α-olefins such as, for example, ethylene, propylene, butene-1, pentene-1, 3-methylbutene-1, 4-methylpentene-1, hexene-1, octene-1, dodecene-1, octadecene-1, 1,7-octadiene and the like. It is understood that α-olefins may be copolymerized with one or more other α-olefins and/or with small amounts, i.e. up to about 25 weight percent based on the polymer of other polymerizable ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50 weight percent, especially from about 0.1 to about 40 weight percent of propylene, butene-1, hexene-1, octene-1, 4-methylpentene-1, 1,7-octadiene or similar α-olefin or E-diolefin based on total monomer.

In the polymerization process employing the aforementioned catalytic reaction product, polymerization is effected by adding a catalytic amount of the catalyst composition to a polymerization zone containing α-olefin monomers, or vice versa. The polymerization zone is maintained at slurry polymerization temperatures, e.g. from about 0° to about 95° C., most preferably from about 50° to about 90° C., for a residence time of from about 15 minutes to about 24 hours, preferably from about 30 minutes to about 8 hours. It is generally desirable to carry out the polymerization in the absence of moisture and oxygen and a catalytic amount of the catalytic reaction product is generally within the range from about 0.0001 to about 0.1 milligram-atoms transition metal per liter of diluent. It is understood, however, that the most advantageous catalyst concentration will depend upon polymerization conditions such as temperature, pressure, diluent and presence of catalyst poisons and that the foregoing range is given to obtain maximum catalyst yields. Generally in the polymerization process, a carrier which may be an inert organic diluent or excess monomer is generally employed. In order to realize the full benefit of the high efficiency catalyst of the present invention care must be taken to avoid oversaturation of the diluent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore.

The polymerization pressures preferably employed are relatively low, e.g. from about 10 to about 500 psig. However, polymerization within the scope of the present invention can occur at pressures from atmospheric up to pressures determined by the capabilities of the polymerization equipment. During polymerization, it is desirable to agitate the polymerization recipe to obtain better temperature control and to maintain uniform polymerization mixtures throughout the polymerization zone.

Hydrogen is often employed in the practice of this invention to control the molecular weight of the resultant polymer. For the purpose of this invention, it is beneficial to employ hydrogen in concentrations, ranging from about 0 to about 80 volume percent in the gas or liquid phase in the polymerization vessel. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst. Using the general method described, the polymerization reactor may be operated liquid full or with a gas phase and at solution or slurry polymerization conditions.

The monomer or mixture of monomers is contacted with the catalytic reaction product in any conventional manner, preferably by bringing the catalyst composition and monomer together with intimate agitation provided by suitable stirring or other means. Agitation can be continued during polymerization. In the case of more rapid reactions with more active catalysts, means can be provided for refluxing monomer and solvent, if any of the latter is present, and thus remove the heat of reaction. In any event, adequate means should be provided for dissipating the exothermic heat of polymerization, e.g. by cooling reactor walls, etc. If desired, the monomer can be brought in the vapor phase into contact with the catalytic reaction product, in the presence or absence of liquid material. The polymerization can be effected in a batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and solvent if any is employed No further removal of impurities is required Thus, a significant advantage of the present invention is the elimination of the catalyst residue removal steps. In some instances, however, it may be desirable to add a small amount of a catalyst deactivating reagent. The resultant polymer is found to contain insignificant amounts of catalyst residue.

The following examples are given to illustrate the invention, and should not be construed as limiting its scope. All parts and percentages are by weight unless otherwise indicated.

In the following examples, the flow rates for the melt index value, $I_2$, and for the value, $I_{10}$, are determined by ASTM D 1238 conditions E and N, respectively. The flow rate ratio, FRR, or $I_{10}/I_2$, is a dimensionless number derived by dividing the flow rate at Condition N by the flow rate at Condition E and is discussed in section 7.3 of ASTM D 1238. The apparent bulk density is determined as an unsettled bulk density according to the procedure of ASTM 1895 employing a paint volumeter from Sargent-Welch Scientific Company (Catalog No. S-64985) as the cylinder instead of the one specified by the ASTM procedure. Polymer particle size is determined by sieving the powder through two sets of U.S.A. Standard Testing Sieves meeting ASTME-11 criteria. To approximately 100 grams of polymer is added 0.1 gram of finely divided carbon black and the mixture is then sieved through number 20, 30, 35, 40 and 60 sieves corresponding to 850, 600, 500, 425 and 250 micron openings, respectively. The weight of the material remaining on the sieves is then measured by difference and the material that passed through the number 60 sieve is further sieved through number 80, 100, 140, and 200 sieves, which correspond to 180, 150, 106 and 75 micron openings, respectively. The percentage of the material passing through each sieve is then calculated and plotted on logarithmic probability paper with the sieve size on the Y-axis. The average size of the powder as measured by weight is determined by the intersection of the best fit curve through the points with the 50% probability line. A standard reference for particle size measurement is Particle Size: Measurement, Interpretation and Application by Riyad R. Irani and Clayton F. Callis, John Wiley & Sons, Inc., New York, 1963.

General Procedure

In each of the following examples and comparative experiments, unless otherwise stated, the catalyst components are blended at ambient temperature in a dry, oxygen free atmosphere using a constant rate of agitation in the vessel. The butylethylmagnesium, triisobutylaluminum, and ethylaluminumdichloride are obtained as solutions in heptane from Texas Alkyls, Inc. All ratios are molar ratios unless otherwise indicated. Silica is obtained from Illinois Minerals, Degussa, or Geduran The average size of the silica is obtained from the product literature of the companies that produced the silica. Geduran Chromatographic Grade silica is sized by sieving through U.S.A. Standard Testing Sieves numbers 140 and 200 corresponding to openings of 106 and 75 microns, respectively.

COMPARATIVE EXPERIMENT A (I) Catalyst Preparation

A 500 ml beaker equipped with a three-blade polypropylene stirrer is used for the preparation of the catalyst. A constant, slow rate of agitation is employed during the addition of the reagents. The temperature of the solution is not controlled during the preparation. All reagents are at ambient temperature before addition, approximately 23° C.

To 100 ml of n-hexane are added 27 ml of 0.616 M butylethylmagnesium solution and 13.5 ml of 0.616 M triisobutylaluminum. To this solution are added dropwise 3.39 ml of neat ethanol. The volume of the solution is then adjusted to 150 ml with n-hexane. To this solution are added 0.50 ml of a 3.36 M hexane solution of tetraisopropyltitanate. To this solution are added dropwise 54.5 ml of 1.53 M ethylaluminumdichloride. The ratios of Mg:Ti and Cl:Mg are 10:1 and 10:1, respectively. The resulting catalyst is aged for at least 8 hours prior to being used for polymerization.

(II) Polymerization

The polymerization is conducted in a 2.5 liter stainless steel reactor by taking an aliquot of the catalyst prepared as described in (A) above containing 0.006 millimoles of titanium and adding the aliquot to 1.6 liters of dry oxygen free hexane containing sufficient triisobutylaluminum to make the ratio of Al:Ti equal to 200:1. The reactor nitrogen atmosphere is replaced with hydrogen by purging, the reactor contents are heated to 85° C., and the reactor pressure adjusted with hydrogen to 50 psig. Ethylene is then added to the reactor to maintain a pressure of 170 psig. After 2 hours at 85° C., the reactor is cooled, the ethylene-hydrogen mixture vented, and the reactor contents filtered. The polyethylene obtained is dried in a vacuum oven overnight at 60° C. The yield of the reaction is 476 grams polyethylene, corresponding to a catalyst efficiency of $1.65 \times 10^6$ grams polymer/gram Ti. The melt index value, $I_2$, is 2.15. The melt index value, $I_{10}$ is 23. The flow rate ratio, $I_{10}/I_2$, is 10.7, and the bulk density of the polyethylene powder is 17.6 lbs/cubic foot (0.2688 g/cc). The polyethylene powder is sieved as described above and the weight average particle size is calculated to be 292 microns.

EXAMPLE 1

(A) Catalyst Preparation

A 500 ml beaker equipped with a three bladed polypropylene stirrer is used for the preparation of the catalyst. A constant, slow rate of agitation is employed during the addition of the reagents. The temperature of the solution is not controlled during the preparation. All reagents are at ambient temperature before addition, approximately 23° C.

To 100 ml of n-hexane are added 6.0 g of Degussa R972 silica with an average particle size of 16 microns and 27 ml of 0.616 M butylethylmagnesium solution. To this solution are added 13.5 ml of 0.616 M triisobutylaluminum. To this solution are added dropwise 3.39 ml of neat ethanol. The volume of the solution is then adjusted to 150 ml with n-hexane. To this solution are added 0.50 ml of a 3.36 M hexane solution of tetraisopropyltitanate. To this solution are added dropwise 54.5 ml of 1.53 M ethylaluminumdichloride. The ratios of Mg:Ti, Cl:Mg and Si:Mg are 10:1, 10:1 and 6:1, respectively. The resulting catalyst is aged for at least 8 hours prior to being used for polymerization.

(B) Polymerization

The polymerization is conducted as in Comparative Experiment A (II) except an aliquot of the catalyst prepared as described in (A) above containing 0.004 millimoles of titanium is added to the polymerization vessel. The polyethylene obtained is dried in a vacuum oven overnight at 60° C. The yield of the reaction is 295 grams polyethylene, corresponding to a catalyst efficiency of $1.54 \times 10^6$ grams polymer/gram Ti. The melt index value, $I_2$, is 0.22. The melt index value, $I_{10}$, is 2.8. The flow ratio, $I_{10}/I_2$, is 12.7 and the bulk density of the polyethylene powder is 9.3 lbs/cubic foot (0.1488 g/cc). The polyethylene powder is sieved as described above and the weight average particle size is calculated to be 166 microns.

EXAMPLE 2

(A) Catalyst Preparation

The catalyst is prepared as in Example 1 except that the inorganic oxide component is replaced with 6.0 g of Illinois Minerals Co. A-10 silica with an average particle size of 10 microns. The ratios of Mg:Ti, Cl:Mg and Si:Mg in the resulting catalyst are 10:1, 10:1 and 6:1, respectively.

(B) Polymerization

The polymerization is conducted as in Comparative Experiment A (II) except an aliquot of the catalyst prepared as described in (A) above containing 0.006 millimoles of titanium is added to the polymerization vessel. The polyethylene obtained is dried in a vacuum oven overnight 60° C. The yield of the reaction is 422 grams polyethylene, corresponding to a catalyst efficiency of $1.47 \times 10^6$ grams polymer/gram Ti. The melt index value, $I_2$, is 1.36. The melt index L value, $I_{10}$, is 14.7. The flow rate ratio, $I_{10}/I_2$, is 10.8, and the bulk density of the polyethylene powder is 16.8 lbs/cubic foot (0.2688 g/cc). The polyethylene powder is sieved as described above and the weight average particle size is calculated to be 237 microns.

EXAMPLE 3

(A) Catalyst Preparation

The catalyst is prepared as in Example 1 except that the inorganic oxide component is replaced with 6.0 g of Illinois Minerals Co. A-108 silica with an average particle size of 8 microns. The ratios of Mg:Ti, Cl:Mg and Si:Mg in the resulting catalyst are 10:1, 10:1 and 6:1, respectively.

(B) Polymerization

The polymerization is conducted as in Comparative Experiment A (11) except an aliquot of the catalyst prepared as described in (A) above containing 0.006 millimoles of titanium is added to the polymerization vessel. The polyethylene obtained is dried in a vacuum oven overnight at 60° C. The yield of the reaction is 403 grams polyethylene, corresponding to a catalyst efficiency of $1.40 \times 10^6$ grams polymer/gram Ti. The melt index value, $I_2$, is 2.49. The melt index value, $I_{10}$, is 21.9. The flow rate ratio, $I_{10}/I_2$, is 8.8, and the bulk density of the polyethylene powder is 17.0 lbs/cubic foot (0.192 g/cc). The polyethylene powder is sieved as described above and the weight average particle size is calculated to be 245 microns.

EXAMPLE 4

(A) Catalyst Preparation

The catalyst is prepared as in Example 1 except that the inorganic oxide component is replaced with 6.0 g of Illinois Minerals Co. A-15 silica with an average particle size of 15 microns. The ratios of Mg:Ti, Cl:Mg and Si:Mg in the resulting catalyst are 10:1, 10:1 and 6:1, respectively.

(B) Polymerization

The polymerization is conducted as in Comparative Experiment A (11) except an aliquot of the catalyst prepared as described in (A) above containing 0.006 millimoles of titanium is added to the polymerization vessel. The polyethylene obtained is dried in a vacuum oven overnight at 60° C. The yield of the reaction is 416 grams polyethylene, corresponding to a catalyst efficiency of $1.44 \times 10^6$ grams polymer/gram Ti. The melt index value, $I_2$, is 2.14. The melt index value, $I_{10}$, is 20.7. The flow rate ratio, $I_{10}/I_2$, is 9.7, and the bulk density of the polyethylene powder is 18.6 lbs/cubic foot (0.2976 g/cc). The polyethylene powder is sieved as described above and the weight average particle size is calculated to be 203 microns.

EXAMPLE 5

(A) Catalyst Preparation

The catalyst is prepared as in Example 1 except that the inorganic oxide component is replaced with 6.0 g of Geduran Chromatographic Grade silica that had been sieved so that it contained particles with a range of sizes less than 75 microns. The ratios of Mg:Ti, Cl:Mg and Si:Mg in the resulting catalyst are 10:1, 10:1 and 6:1, respectively.

(B) Polymerization

The polymerization is conducted as in Comparative Experiment A (II) except an aliquot of the catalyst prepared as described in (A) above containing 0.004 millimoles of titanium is added to the polymerization vessel. The polyethylene obtained is dried in a vacuum oven overnight at 60° C. The yield of the reaction is 301 grams polyethylene, corresponding to a catalyst efficiency of $1.56 \times 10^6$ grams polymer/gram Ti. The melt index value $I_2$, $<0.02$. The melt index value $I_{10}$, is 0.09. The flow rate ratio, $I_{10}/I_2$, is $>4.5$. The bulk density of the polyethylene powder is 15.4 lbs/cubic foot (0.2464 g/cc). The polyethylene powder is sieved as described above and the weight average particle size is calculated to 410 microns.

EXAMPLE 6

(A) Catalyst Preparation

The catalyst is prepared as in Example 1 except that the inorganic oxide component is replaced with 6.0 g of Geduran silica with a particle size range of between 75 and 106 microns The ratios of Mg:Ti, Cl:Mg and Si:Mg in the resulting catalyst are 10:1, 10:1 and 6:1, respectively.

(B) Polymerization

The polymerization is conducted as in Comparative Experiment A (II) except an aliquot of the catalyst prepared as described in (A) above containing 0.010 millimoles of titanium is added to the polymerization vessel. The polyethylene obtained is dried in a vacuum oven overnight at 60° C. The yield of the reaction is 100 grams polyethylene, corresponding to a catalyst efficiency of 208,000 grams polymer/gram Ti. The melt index value, $I_2$, is 0.92. The $I_{10}$ melt index value is 8.98. The flow rate ratio, $I_{10}/I_2$, is 9.8, and the bulk density of the polyethylene powder is 7.0 lbs/cubic foot (0.112 g/cc). The polyethylene powder is sieved as described above and the weight average particle size is calculated to be 454 microns.

EXAMPLE 7

(A) Catalyst Preparation

The catalyst is prepared as in Example 1 except that the inorganic oxide component is replaced with 20.0 g of Illinois Minerals Co. A-108 silica that had an average particle size of 8 microns. The ratios of Mg:Ti, Cl:Mg and Si:Mg in the resulting catalyst are 10:1, 10:1 and 20:1, respectively.

(B) Polymerization

The polymerization is conducted as in Comparative Experiment A (II) except an aliquot of the catalyst prepared as described in (A) above containing 0.006 millimoles of titanium is added to the polymerization vessel. The polyethylene obtained is dried in a vacuum oven overnight at 60° C. The yield of the reaction is 480 grams polyethylene, corresponding to a catalyst efficiency of $1.67 \times 10^6$ grams polymer/gram Ti. The melt index value, $I_2$, is 1.88. The melt index value, $I_{10}$, is 19.3. The flow rate ratio, $I_{10}/I_2$, 10.2 and the bulk density of the polyethylene powder is 15.6 lbs/cubic foot (0.2496 g/cc). The polyethylene powder is sieved as described above and the weight average particle size is calculated to be 154 microns.

Comparative experiment A is a comparative example. Examples 1–4 are examples of the present invention in which relatively small size silica is employed as the inorganic oxide component. Examples 5 and 6 are examples of the present invention in which silica of a relatively large average size is employed as the inorganic oxide component. Example 7 is an example of the present invention in which relatively small size silica is employed as the inorganic oxide component with a larger ratio of Si:Mg in the resulting catalyst than Examples 1–4. Table I presents a summary of the Runs (experiments) which shows the control of polymer particle size achieved.

TABLE I

| Example or Comparative Experiment | Average Size of Silica (Microns) | Average Size of Polymer (Microns) |
|---|---|---|
| Comp. Expt. A | No Silica | 292 |
| Ex. 1 | 16 | 166 |
| Ex. 2 | 10 | 237 |
| Ex. 3 | 8 | 245 |
| Ex. 4 | 15 | 206 |
| Ex. 5 | < 75 (Range) | 452 |
| Ex. 6 | 75–106 (Range) | 410 |
| Ex. 7 | 8 | 154 |

What is claimed is:

1. A catalytic product resulting from admixing in an inert hydrocarbon diluent and in an atmosphere which excludes moisture and oxygen
   (A) at least one inorganic oxide support which is an oxide of an element M and having a particle size of 1000 microns or less and which has not been heat or chemically treated prior to contact with the other catalyst components;
   (B) at least one hydrocarbon soluble organomagnesium compound;
   (C) at least one alcoholic organic hydroxyl-containing compound;
   (D) at least one reducing halide ($X_{red}$) source; and
   (E) at least one transition metal (Tm) compound; and wherein
   (1) the components are added in the order (A), (B), (C), (D) and (E) or (A), (B), (C), (E) and (D) or (B), (A), (C), (D) and (E) or (B), (A), (C), (E) and (D);
   (2) the components are employed in quantities so as to provide the following atomic ratios
      (a) Mg:Tm of from about 0.1:1 to about 100:1;
      (b) M:Mg of from about 0.1:1 to about 1000:1;
      (c) $X_{red}$:Mg of from about 3:1 to about 20:1; and
   (3) component (C) is present in a quantity such that for every metal atom present in component (B), there remains on the average no more than about 0.9 hydrocarbon groups attached to any metal atom therein.

2. A catalytic product of claim 1 wherein
   (a) component (A) is an oxide of silicon or aluminum or a combination thereof;
   (b) component (B) is represented by the formula $R_2Mg \cdot xMeR'_{x'}$ wherein each R is independently a hydrocarbyl group having from 1 to about 20 carbon atoms; each R' is independently hydrogen, a hydrocarbyl group having from 1 to about 20 carbon atoms; Me is Al or Zn; x has a value from zero to 10 and is sufficient to render the organomagnesium component hydrocarbon soluble; and x' has a value equal to the valence of Me;
   (c) component (C) is represented by the formula ROH wherein each R is a hydrocarbyl group having from 1 to about 20 carbon atoms;
   (d) component (D) is represented by the formula $Al(R^3)_{3-m}X_m$ including mixtures thereof wherein each $R^3$ is independently hydrogen or a hydrocarbyl group as above defined; X is a halogen: and m has a value from 1 to 2;
   (e) component (E) is represented by the formulae $TmY_nX_{z-n}$ or

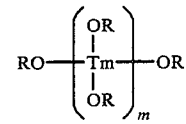

wherein Tm is titanium in its highest stable valence state; Y is oxygen or OR"; R is a hydrocarbyl group having from 1 to about 20 carbon atoms; X is a halogen; z has a value corresponding to the valence of the transition metal, Tm; m has a value from 2 to about 20; n has a value from zero to 4; the value of z-n is from zero up to a value equal to the valence state of the transition metal, Tm;
   (f) the atomic ratio of Mg:Tm is from about 1:1 to about 40:1;
   (g) the atomic ratio of M:Mg is from about 1:1 to about 500:1: and
   (h) the atomic ratio of $X_{red}$:Mg is from about 6:1 to about 20:1.

3. A catalytic product of claim 2 wherein
   (a) in component (B), each R and R' is a hydrocarbyl group having from 1 to about 10 carbon atoms; Me is Al and x has a value from about 0.2 to about 2;
   (b) component (C), is an alcohol having from 1 to about 10 carbon atoms;
   (c) (component (D), is an aluminum alkyl halide wherein each $R^3$ is independently a hydrocarbyl group having from 1 to about 10 carbon atoms;
   (d) in component (E), each R independently has from 1 to about 10 carbon atoms, Tm is titanium; and m has a value from 2 to about 10;
   (e) the atomic ratio of Mg:Tm is from about 5:1 to about 20:1;
   (f) the atomic ratio of M:Mg is from about 1:1 to about 100:1; and (g) the $X_{red}$Mg atomic ratio is from about 8:1 to about 14:1.

4. A catalytic product of claim 3 wherein
   (a) component (B) is butyl ethyl magnesium·½ triisobutylaluminum, di(n-butyl) magnesium·½ triisobutylaluminum, di(n-hexyl) magnesium·½ triisobutylaluminum, butyl octyl magnesium·½ triisobutylaluminum, butyl ethyl magnesium, di-(n-hexyl) magnesium, or any combination thereof;
   (b) component (C) is n-propyl alcohol, 2-pentanol, n-octyl alcohol, or any combination thereof;
   (c) component (D) is ethylaluminum dichloride, ethylaluminum sesquichloride, diethylaluminum chloride, or any combination thereof; and
   (d) Component (E) is tetraisopropoxytitanium, titanium tetrachloride, tetra(n-butoxy) titanium, tetra(2-ethylhexoxy) titanium, isopropyltitanate decamer, or any combination thereof.

5. A catalytic product of claim 3 wherein component (E) is tetraisopropoxytitanium, tetra(n-butoxy) titanium, isopropyltitanate decamer, or any combination thereof.

6. A catalytic product of claim 1, 2, 3, 4 or 5 wherein the solid insoluble portion is separated from the soluble portion and the insoluble portion washed with an inert hydrocarbon.

* * * * *